United States Patent [19]

Aoki et al.

[11] Patent Number: 5,236,783

[45] Date of Patent: Aug. 17, 1993

[54] SUPERPARAMAGNETIC FINE PARTICLES OF IRON OXIDE AND MAGNETIC RECORDING MEDIA CONTAINING SAID PARTICLES

[75] Inventors: Koso Aoki, Hiroshima; Masaaki Fukugauchi, Aki; Tomoyuki Imai, Hiroshima; Nanao Horiishi, Hiroshima; Kazuyuki Hayashi, Hiroshima, all of Japan

[73] Assignee: Toda Kogyo Corp., Hiroshima, Japan

[21] Appl. No.: 657,733

[22] Filed: Feb. 20, 1991

[30] Foreign Application Priority Data

Feb. 21, 1990 [JP] Japan .................................. 2-42177
Sep. 28, 1990 [JP] Japan ................................ 2-262205

[51] Int. Cl.$^5$ ............................................. B32B 9/00
[52] U.S. Cl. ................................ 428/403; 252/62.56; 252/62.58; 252/62.59; 423/633; 423/634; 428/404
[58] Field of Search ........................... 428/403, 404; 252/62.56, 62.58, 62.59; 423/633, 634

[56] References Cited

U.S. PATENT DOCUMENTS

| Re. 32,573 | 1/1988 | Furumura et al. | 252/62.52 |
|---|---|---|---|
| 3,904,540 | 9/1975 | Bennetch et al. | 252/62.54 |
| 4,026,713 | 5/1977 | Sambucetti et al. | 252/62.56 |
| 4,082,905 | 4/1978 | Stephen et al. | 252/62.58 |
| 4,094,804 | 6/1978 | Shimoiizaka | 252/62.52 |
| 4,108,787 | 8/1978 | Masaki et al. | 252/62.56 |
| 4,176,172 | 11/1979 | Bennetch et al. | 252/62.56 |
| 4,687,596 | 8/1987 | Borduz et al. | 252/62.56 |
| 4,810,401 | 3/1989 | Mair et al. | 252/62.56 |
| 5,064,550 | 11/1991 | Wyman | 252/62.51 |

FOREIGN PATENT DOCUMENTS 0165536 12/1985 European Pat. Off. .

*Primary Examiner*—Paul J. Thibodeau
*Assistant Examiner*—D. S. Nakarani
*Attorney, Agent, or Firm*—Nixon & Vanderhye

[57] ABSTRACT

Disclosed herein is superparamagnetic fine particles of iron oxide having an unsaturated fatty acid adsorbed on the surface of superparamagnetic fine particles, and having a magnetization of not less than 50 emu/g, the rate of change of the magnetization of not more than 10%, and an $Fe^{2+}$ content (calculated as $Fe^{2+}/Fe^{3+}$ molar ratio) of 0.16–0.5.

4 Claims, 2 Drawing Sheets

SUPERPARAMAGNETIC FINE PARTICLES OF IRON OXIDE AND MAGNETIC RECORDING MEDIA CONTAINING SAID PARTICLES

BACKGROUND OF THE INVENTION

The present invention relates to superparamagnetic fine particles of iron oxide which are large in magnetization, excellent in oxidation stability and black in color; and the magnetic recording media containing the said particles which, owing to the presence of the superparamagnetic fine particles of iron oxide in the magnetic recording layer, are excellent in orientation property and packing property of the magnetic particles in the magnetic recording layer and also are minimized in necessary content of carbon black particles.

As one method for developing electrostatic latent images, there is known and popularly used a so-called single-component magnetic toner developing method using as developing agent the composite particles comprising magnetic particles such as magnetite particles mixed and dispersed in a resin without using a carrier.

With progressing longer recording time, and miniaturization size and weight reduction of both video and audio magnetic recording and reproducing devices, a request is arisen keenly for higher quality and performance, that is, higher-density recording and lower noise level of the magnetic recording media such as magnetic tapes and magnetic discs. For attaining this request, it is necessary that the magnetic particles used in the recording media are high in saturation magnetization, excellent in miscibility and also black in color.

This fact is pointed out, for instance, in Japanese Patent Application Laid-Open (KOKAI) No. 65406/80, which states:

"Generally, the magnetic powder used for such single-component magnetic toner is required to have the following properties: i) The flux density in a magnetic field of about $10^3$ Oe is as high as it can be. For instance, it is necessary for the magnetic powder to have a maximum magnetization $\sigma m$ of about not less than 40 emu/g. ............ iv) The magnetic particles have blackness that can stand practical use. A colorant may be contained in the magnetic toner, but it is desirable that the magnetic powder itself has a black color and no colorant is used............. vii) The magnetic particles have good miscibility with resin. ............ A microscopic degree of mixing in the toner is important for the properties of toner......."

Excellent dispersibility of the magnetic particles is essential for the improvement of miscibility of the magnetic particles with resin, and this requires that the magnetic attractive force of particles is small with minimized residual magnetization.

It is known that the blackness degree of magnetic particles such as magnetite particles is varied principally by average particle size and $Fe^{2+}$ content, and it is required that the molar ratio of Fe2+ content to Fe3+ is not less than 0.16. Such fact is described in "Powder and Powder Metallurgy" Vol. 26, No. 7, pp. 239–240, 1979 (published by Japan Society of Powder and Powder Metallurgy) which states: "The blackness degree of the samples is variable depending on Fe(II) content and average particle size ...... When the Fe(II) content is more than 10%, all the samples have a black color although a slight difference is noted in the blackness degree. When the Fe(II) content decreases to less than 10%, each sample changes in color from black to reddish brown."

The magnetic particles which have hitherto been used for magnetic toner include (i) the octahedral magnetite particles produced by passing an oxygen-containing gas through a suspension containing ferrous hydroxide colloid and having a pH of not less than 10 obtained by reacting a ferrous salt solution with an alkaline solution of not less than one equivalent to $Fe^{2+}$ in the said ferrous salt solution (Japanese Patent Publication No. 668/69), and (ii) the spherical magnetite particles obtained by, as the first step forming spherical particles by passing an oxygen-containing gas through a ferrous salt reaction solution containing ferrous hydroxide colloid obtained by reacting a ferrous salt solution with an alkali hydroxide of 0.80–0.99 equivalent to $Fe^{2+}$ in the said ferrous salt solution, and after the said first step reaction, adding an alkali hydroxide of not less than 1.00 equivalent to residual $Fe^{2+}$ and oxidizing the resultant mixture with a pH not less than 10 under heating (Japanese Patent Publication No. 51208/87).

On the other hand, with the request for higher image quality and performance of video tapes, the frequency of recorded carrier signal is increasing as compared with the conventional video tapes, that is, the signal frequency is shifting to a shorter wavelength region and, as a result, the depth of magnetization from the magnetic tape surface has been markedly lessened. Efforts are being made for further improving the high output characteristics while maintaining the desired level of CN ratio even for short wavelength signals. For attaining this, there are required ① ultra-fine dividing of magnetic particles, ② smoothening of magnetic coat surface, ③ reducing of thickness of magnetic coating film, and ④ high dispersing of magnetic particles.

This fact is referred to in, for instance, "Development of Magnetic Material and High-Degree Dispersion Techniques for Magnetic powder", p. 312 (1982) (published by Sogo Gijutsu Center) which states: "An essential condition for high-density recording on the coating-type tapes is to maintain a low noise level and high output characteristics for short wavelength signals. This necessitates a high coercive force (Hc) and a high residual magnetization (Br) as well as a small thickness of coating film", and an article in the May 3 issue of Nikkei Electronics (1976) on pages 82–105, which states: "The physical qualitative factors of tape associated with SN ratio (CN ratio) of luminance signal include average number of particles per unit volume, state of dispersion (dispersibility) of the particles and particle-surface smoothness. If the surface properties and dispersing properties are constant, the SN ratio is improved proportionally to the square root of the average number of particles, so that it is more advantageous to use a magnetic powder which can be made less in particle volume and higher in packing-degree."

As seen above, the common condition for satisfying the said requirements ② to ④ for improving the high output characteristics is a high dispersing of magnetic particles. In these days when there is a preference for use of ultra-fine particles whose high-dispersing is difficult, realization of high-dispersing of magnetic particles is of especially great significance.

On the other hand, stoppage of a magnetic tape, especially a magnetic recording medium such as video type, is conducted by detecting the portion with high light transmittance of the magnetic recording medium by a video deck. Detection by a video deck becomes difficult when light transmittance of the whole magnetic recording layer increases with thickness reduction of the magnetic recording medium or fine-division of magnetic particles as mentioned before, so that it is practiced to lower light transmittance by adding carbon to the magnetic recording layer. Thus, in the currently used video tapes, addition of carbon to the magnetic recording layer is essential.

The improvements of dispersibility of magnetic particles in a vehicle by use of the magnetic particles containing superparamagnetic iron oxide are proposed (Japanese Patent Publication Nos. 18766/83 and 12286/85).

The magnetic particles which are large in magnetization, small in magnetic attractive force owing to minimized residual magnetization and black in color are most acutely required at present. The octahedral magnetite particles (i) mentioned above have as high a value of magnetization as about 80 emu/g and are also excellent in blackness, but these particles have the problem in miscibility since they have residual magnetization of not less than 9 emu/g and tend to cause magnetic agglomeration. On the other hand, the spherical magnetite particles (ii) also mentioned above, although having as large a value of magnetization as over 80 emu/g, the particles have a brownish black color and are poor in blackness. Also, these particles have residual magnetization of about 4 to 6 emu/g, which is small in comparison with that of the octahedral magnetite particles but is still not satisfactorily small.

Superparamagnetic fine particles of iron oxide are known as the magnetic particles whose residual magnetization is almost zero. However, these superparamagnetic particles of iron oxide, because of extremely small particle size, are liable to be oxidized by oxygen in the air and very unstable chemically and magnetically. Thus, these particles, when exposed to the atmospheric air, undergo an oxidation reaction with oxygen in the air and are lowered in the magnetization. Further, the oxidation reaction of these particles proceeds during storage in the atmospheric air and their magnetization lowers in the passage of time. Also, the color of these particles changes to reddish brown due to oxidation of $Fe^{2+}$ into $Fe^{3+}$.

In view of the above, it is an object of the present invention to provide the superparamagnetic fine particles of iron oxide which have large magnetization and excellent resistance to oxidation.

On the other hand, it is most keenly required at present to improve dispersibility of magnetic particles in vehicle in the production of magnetic recording media. However, when carbon black particles are added in forming a coating composition by mixing a binder resin and magnetic particles, dispersion of magnetic particles in vehicle is disturbed, giving rise to the problem of deteriorated orientation property and packing property of the magnetic particles in the coating larger.

Further, carbon black particles are hard to handle and poor in workability since their apparent density is as low as about 0.1 g/cm$^3$. Also, their problems in safety and hygienic aspects, such as carcinogenecity, are pointed out. On the other hand, use of the magnetic particles containing a superparamagnetic iron oxide such as disclosed in aforementioned Japanese Patent Publication Nos. 18766/83 and 12286/85 has the defect that the effect of reducing light transmittance is unsatisfactory although dispersibility of the particles in vehicle is improved.

It is a further object of the present invention to provide the magnetic recording media having very excellent dispersibility of magnetic particles in vehicle and a lowered light transmittance reducing a content of carbon black particles.

As a result of the present inventors' extensive studies for solving the said problems, it has been found that (1) by adding an unsaturated fatty acid or a salt thereof to an aqueous suspension containing superparamagnetic fine particles of iron oxide, stirring the mixture with a pH of not less than 9 at a temperature of 50–100° C. to form a dispersion, adding an acid to the said dispersion so as to lower the pH to not more than 7, thereby adsorbing the unsaturated fatty acid on the surfaces of the said fine particles, then washing the thus obtained particles, dehydrating them, wetting them with an organic solvent miscible with water and finally drying them in a vacuum, the obtained superparamagnetic fine particles of iron oxide having an unsaturated fatty acid adsorbed on the particle surfaces, a magnetization of not less than 50 emu/g, the rate of change of the magnetization of not more than 10%, and the $Fe^{2+}$ to $Fe^{3+}$ molar ratio of 0.16–0.5, show an excellent blackness and are small in magnetic attractive force owing to zero residual magnetization and excellent in miscibility with resin; and (2) by coating on a substrate a coating composition comprising the said superparamagnetic fine particles of iron oxide, carbon black particles, magnetic particles and a binder resin, the total amount of the said superparamagnetic fine particles and carbon black particles being 0.1 to 10% by weight based on the magnetic particles and the weight ratio of the said superparamagnetic fine particles to the total amount of the said superparamagnetic fine particles and carbon black particles being 10 to 90, the obtained magnetic recording media are suited for use as magnetic recording media for high-density recording with low noise level owing to the excellent orientation property and packing property of the magnetic particles in the coating layer, and are also excellent in workability in the preparation of magnetic coating composition and advantageous from the aspects of safety and hygiene too, because of low content of carbon black. The present invention has been attained on the basis of these findings.

SUMMARY OF THE INVENTION

In a first aspect of the present invention, there are provided superparamagnetic fine particles of iron oxide, having an unsaturated fatty acid adsorbed on the surface of superparamagnetic fine particles of iron oxide and having a magnetization of not less than 50 emu/g, the rate of change of the magnetization of not more than 10%, and a molar ratio of $Fe^{2+}$ to $Fe^{3+}$ of 0.16–0.5.

In a second aspect of the present invention, there are provided superparamagnetic fine particles of iron oxide having an oxide or hydroxide containing Al and/or Si present on the surface of superparamagnetic fine particles of iron oxide and an unsaturated fatty acid adsorbed on the surface thereof, and having a magnetization of not less than 50 emu/g, the rate of change of magnetization of not more than 5%, and a molar ratio of $Fe^{2+}$ to $F^{3+}$ of 0.16–0.5.

In a third aspect of the present invention, there is provided a magnetic recording medium comprising a substrate, a coating layer which is formed on the substrate and is composed of magnetic particles, carbon black particles, superparamagnetic fine particles of iron oxide and a binder resin, wherein the total amount of the said carbon black particles and the said superparamagnetic fine particles is 0.1 to 10% by weight based on the said magnetic particles, and the weight ratio of the said superparamagnetic fine particles to the total amount of the superparamagnetic fine particles and the said carbon black particles is 10 to 90.

In a fourth aspect of the present invention, there is provided a process for producing superparamagnetic fine particles of iron oxide as defined in the first aspect, which comprises adding an unsaturated fatty acid or a salt thereof to an aqueous suspension containing superparamagnetic fine particles of iron oxide, stirring the mixture with a pH of not less than 9 at a temperature of 50-100° C. to form a dispersion, adding an acid to the said dispersion so as to lower the pH to not more than 5 so that the said unsaturated fatty acid is adsorbed on the surfaces of the said fine particles, then washing the obtained fine particles with water, dehydrating them, wetting them with an organic solvent miscible with water, and finally drying the thus treated particles in a vacuum.

In a fifth aspect of the present invention, there is provided a process for producing superparamagnetic fine particles of iron oxide as defined in the second aspect, which comprises adding an unsaturated fatty acid or a salt thereof to an aqueous suspension containing superparamagnetic fine particles of iron oxide, which are present on their surfaces an oxide or hydroxide containing Al and/or Si, stirring the mixture with a pH of not less than 8 at a temperature of 50-100° C. to form a dispersion, adding an acid to the said dispersion in order to lower the pH to not more than 7, so that the unsaturated fatty acid adsorbed on the surface of the said fine particles having on their surfaces an oxide or hydroxide containing Al and/or Si, then washing the obtained fine particles with water, dehydrating them, wetting them with an organic solvent miscible with water, and drying the thus treated particles in a vacuum.

DETAILED DESCRIPTION OF THE INVENTION

Figure 1:
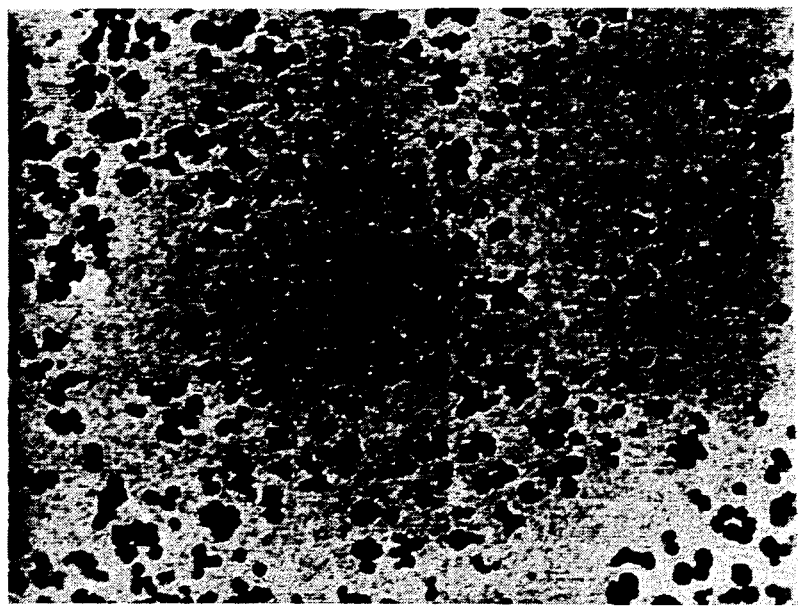
FIG. 1 is an electron micrograph ($\times 200,000$) showing the structure of a superparamagnetic fine particle of iron oxide obtained in Example 1.

A large magnetization and excellent resistance to oxidation of the superparamagnetic fine particles of iron oxide according to the present invention may be accounted for by the following reason. As discussed in the Comparative Examples described later, in case of adsorbing an unsaturated fatty acid on the surface of superparamagnetic fine particles of iron oxide and drying the obtained particles in the atmosphere or in a vacuum under heating or in case of wetting superparamagnetic fine particles of iron oxide with an organic solvent miscible with water and then drying the obtained particles in a vacuum without adsorbing an unsaturated fatty acid on the surface of the superparamagnetic fine particles, the obtained superparamagnetic fine particles tend to be oxidized in the course of drying or during storage and the objective superparamagnetic fine particles can not be obtained. So, it is considered that according to the present invention, owing to the synergistic effect provided by adsorption of an unsaturated fatty acid on the surface of the superparamagnetic fine particles and drying in a vacuum after wetting with an organic solvent miscible with water, moisture on the particle surfaces can be removed quickly, thereby preventing oxidation of the particles in the course of drying or during storage.

The superparamagnetic fine particles of iron oxide according to the present invention are almost free from magnetic attraction since the residual magnetization is substantially zero. These fine particles are also well mixable with resin since the surface of each particle is coated with an unsaturated fatty acid.

Japanese Patent Publication No. 4078/78 discloses a particle coating method in which the surfaces of superparamagnetic fine particles of iron oxide are coated with oleic acid or ions thereof which is a kind of unsaturated fatty acid. According to this method, however, a lipophilic group is adsorbed on the particle surfaces in the form of a monomolecular layer for the purpose of improving dispersibility of the particles in both nonpolar and polar solvents, so that this method is quite different in object, structure and effect from the present invention which is intended to provide the superparamagnetic fine particles very stable against oxygen with the object of making it possible to safely and stably take out the particles into the air.

Superparamagnetic fine particles of iron oxide used as a starting material of the present invention can be produced by the conventional methods. For instance, the said superparamagnetic fine particles can be obtained by adding an alkali to a mixed aqueous solution containing a ferrous salt and a ferric salt in a molar ratio of 1 : 2 to make the pH not less than 9 and then subjecting the resultant mixture to an aging reaction at a proper temperature; or by adding an alkali as precipitant to an acidic solution containing Fe (II) ions in a ratio of 1.1-1.5 atom to 1 atom of Fe (III) ions and then oxidizing the resultant mixture at a temperature of 50-70° C. (Japanese Patent Application Laid-Open (KOKAI) No. 175734/82).

In the method according to the present invention, the solution in which the superparamagnetic fine particles are to be suspended is a solution containing an unsaturated fatty acid or a basic salt thereof and having a temperature of 50-100° C., preferably 60-90° C. and a pH of not less than the preferably pH 10-12.

When the solution temperature is below 50° C., it is difficult to effect uniform monodispersion of the fine particles. On the other hand, when the solution temperature exceeds 100° C, although uniform monodispersion of the fine particles can be effected, a specific apparatus such as acutoclave is required, leading to a poor economy.

In case the pH of the solution is below 9, it is difficult to effect uniform monodispersion of the fine particles and to have an unsaturated fatty acid adsorbed on the surface of every fine particle.

As the unsaturated fatty acid, there can be used monoene unsaturated fatty acids such as oleic acid and erucic acid, and polyene unsaturated fatty acids such as linolic acid and linoleic acid.

The amount of the unsaturated fatty acid or a salt thereof added is not more than 200 wt%, preferably 10 to 100 wt%, based on the fine particle. Addition of the unsaturated fatty acid or a salt thereof in excess of 200 wt% causes a corresponding increase of the amount of unsaturated fatty acid non-adsorbed to the particle surfaces and a worsened working efficiency for removing such non-adsorbed fatty acid. Thus, it is meaningless to add an unsaturated fatty acid or a salt thereof in an amount greater than necessary.

The lower limit of the amount of an unsaturated fatty acid or a salt thereof added in the present invention is determined so that the coverage ($\theta$) of the unsaturated fatty acid adsorbed on the particle surface becomes not less than 0.5. With the coverage below 0.5, it is difficult to obtain the superparamagnetic fine particles having excellent oxidation stability according to the present invention.

The "coverage ($\theta$)" referred to herein means the rate at which the particle surface is covered with an unsaturated fatty acid, and in the present invention, it was determined from the following formula:

$$\theta = \frac{w}{M} \times 6.023 \times 10^{23} \times \frac{A}{S \times 10^{20}}$$

wherein
w: weight (g) of the unsaturated fatty acid adsorbed per 1 g of superparamagnetic fine particles;
M: molecular weight of the unsaturated fatty acid;
A: area (Å$^2$) occupied by the adsorbed unsaturated fatty acid;
S: BET specific surface area (m$^2$/g) of superparamagnetic fine particles after N$_2$ adsorption.

In the present invention, the coverage ($\theta$) of the molecular layer of unsaturated fatty acid adsorbed on the particle surface is 0.5–1.2.

When the coverage ($\theta$) is less than 0.5, the effect of preventing oxidation becomes insufficient, and it is difficult to obtain the superparamagnetic fine particles of iron oxide with excellent resistance to oxidation. When the coverage ($\theta$) exceeds 1.2, the produced superparamagnetic fine particles become hydrophilic and tend to be oxidized, because of the increase of the unsaturated fatty acid which remains nonadsorbed on the particle surfaces.

In the present invention, an acid is added to the resultant suspension to make its pH not more than 7, preferably 4 to 6.5.

As acid, there can be used H$_2$SO$_4$, HCl, CH$_3$COOH and the like.

When the pH of the suspension exceeds 7, the dimolecular layer of unsaturated fatty acid adsorbed on the particle surface in a dispersion with a pH of not less than 9 can hardly be made into a monomolecular layer, and the produced particles become hydrophilic and hence labile to oxygen. Also, the obtained fine particles assume a dispersed state in water, and it becomes difficult to take out the fine particles as precipitate. When the pH is less than 4, there are some cases where the fine particles may be dissolved.

Water washing of the obtained fine particles in the present invention can be accomplished by a conventional method. For example, decantation can be employed for this purpose.

As the organic solvent miscible with water used in the present invention, a low-boiling point organic solvent such as methanol, ethanol, acetone, and the like is preferably used.

Drying in a vacuum according to the present invention can be performed by a commonly practiced method using a vacuum dryer or like means.

The weight of the unsaturated fatty acid adsorbed on the surface of the superparamagnetic fine particle according to the present invention is 1 to 100 wt%, preferably 5 to 30 wt%.

The magnetization of the superparamagnetic fine particles of iron oxide according to the present invention is not less than 50 emu/g, the rate of change of the magnetization is not more than 10%, preferably not more than 5%, the content of Fe$^{2+}$ (calculated as molar ratio to Fe3+) is 0.16-0.5, the L* value is not more than 25, a* is not more than 10, preferably not more than 5, and each gloss at the angles of incidence of 45° and 60° is not less than 30 and 40, preferably not less than 50 and 60.

The superparamagnetic fine particles of iron oxide according to the present invention include particles in which an oxide or hydroxide containing Al and/or Si is present between the particle surface and the unsaturated fatty acid adsorbed on the particle surface.

The weight of the Al- and/or Si-containing oxide or hydroxide which exists on the surface of superparamagnetic fine particles of iron oxide according to the present invention is 0.01 to 50 wt%, preferably 0.1 to 10 wt%, and the weight of the unsaturated fatty acid adsorbed is 1 to 100 wt%, preferably 5 to 30 wt%.

In the present invention, the solution containing an Al and/or Si compound, in which the superparamagnetic fine particles are suspended, has a pH not less than 8 and a temperature of 50 to 100° C. As the Al and/or Si compound in the present invention, sodium aluminate, aluminium sulfonate, aluminium sol water glass and colloidal silica may be exemplified. The amount of the said Al and/or Si compound added in the solution is not more than 100 wt%, preferably 1 to 50 wt%, based on the particle.

The solution containing an unsaturated fatty acid or a basic salt thereof, in which the superparamagnetic fine particles having an Al- and/or Si-containing oxide or hydroxide are suspended, has a pH of not less than 8 and a temperature of 50 to 100° C.

A dispersion is formed by stirring the resultant mixture at a temperature in the said range and an acid is added to the said dispersion so as to lower the pH to not more than 7, preferably, 4 to 6.5, thereby forming a monomolecular layer of an unsaturated fatty acid on the particle surfaces. The thus obtained fine particles are washed with water, dehydrated, wetted with an organic solvent miscible with water and dried in a vacuum.

The magnetization of such superparamagnetic fine particles of iron oxide according to the present invention is not less than 50 emu/g, the rate of change of the magnetization is not more than 5%, preferably not more than 3%, the content of Fe2+ (calculated as molar ratio to Fe3+) is 0.16–0.5, the L* value is not more than 50, preferably not more than 25, a* is not more than 10, preferably not more than 5, and each gloss at the angles of 45° and 60° is not less than 30 and 40, preferably not less than 50 and 60.

The magnetic recording media according to the present invention can be obtained by applying a coating composition comprising the said superparamagnetic fine particles of iron oxide, carbon black particles, binder resin and magnetic particles on a substrate. The coating layer may contain a lubricant, abrasive, antistatic agent and/or other additives which are normally used.

As the magnetic particles contained in the said coating layer, there can be used, for instance, maghemite particles, magnetite particles, magnetic iron oxide particles of Berthollide compounds ($Fe_2O_3$, $0<x<1$), these magnetic iron oxide particles containing other elements than Fe, such as Co, Al, Ni, P, Zn, Si, B, etc., the magnetic iron oxide particles coated with Co, magnetic metal particles containing iron as a main component, magnetic iron based alloy particles containing other elements than Fe, such as Co, Al, Ni, P, Zn, Si, B, etc., plate-like (lamellar) Ba ferrite particles and plate like (lamellar) composite ferrite particles containing a divalent metal (Co, Ni, Zn, etc.) and a tetravalent metal (Ti, Sn, Zr, etc.) which are a coercive-force reducing agent. The shape of the magnetic particles is not specified; these particles may be, for instance, acicular, spindle, cubic or plate like (lamellar). The size of the magnetic particles used in the present invention is not specifically defined, but the particle size (or major axil diameter) of $0.1~0.3$ μm are preferred. In the present invention, dispersibility of the particles in vehicle is improved even in case of using the magnetic particles having a BET specific surface area of not less than 30 $m^2/g$, especially not less than 40 mz/g which are usually hard to disperse.

As the binder resin, there can be used vinyl chloridevinyl acetate copolymer, vinyl chloride-vinyl acetate-urethane maleate elastomer, butadiene-acrylonitrile copolymer, polyvinyl butyral, cellulose derivatives such as nitrocellulose, polyester resin, synthetic rubber resins such as polybutadiene, epoxy resin, polyamide resin, isocyanate resin, electron radiation curable acrylic urethane resin, and mixtures thereof, which are generally used in the production of magnetic recording media.

As the substrate, there can be used the films of synthetic resins such as polyethylene terephthalate, polyethylene, polypropylene, polycarbonate, polyethylene naphthalate, polyamide, polyamide-imide, polyimide, polysulfone, etc., foils and plates of metals such as aluminum, stainless steel, etc., and various kinds of paper.

As for the carbon black particles, there can be used the commercial products which are usually used in the production of magnetic recording media.

The superparamagnetic fine particles of iron oxide used in the present invention can be produced by the conventional methods, for example, a mixed aqueous solution containing ferrous salt and ferric salt in a molar ratio of 1:2 is added with an alkali to make the pH of the solution not less than 9 and then subjected to an aging reaction at an appropriate temperature; or an alkali is added as precipitant to an acidic solution containing Fe(II) ions in a ratio of 1.1–1.5 atom to 1 atom of Fe(III) ions, and then the resultant mixture is oxidized at a temperature of 50–70° C (Japanese Patent Application Laid-Open (KOKAI) No. 175734/82).

These obtained superparamagnetic fine particles of iron oxide, because of extremely small size, are susceptible to oxidation with oxygen in the air and very unstable chemically and magnetically, so that when producing a magnetic recording medium by using the said fine particles, there are used certain specific techniques: that is, (i) a surfactant is added to an aqueous solution containing the obtained fine particles so as to coat the particle surfaces with the said surfactant, then the coated fine particles are transferred into an organic solvent and the resulting particle-containing organic solvent is added into and mixed with the coating composition; or (ii) an unsaturated fatty acid or a salt thereof is added to an aqueous suspension containing the said superparamagnetic fine particles of iron oxide or superparamagnetic fine particles of iron oxide which are present on their surfaces an Al- and/or Si-containing oxide or hydroxide, followed by stirring of the suspension with a pH of not less than 9 at a temperature of 50–100° C. to form a dispersion, then an acid is added to the said dispersion to lower the pH to not more than 7 so that the unsaturated fatty acid is adsorbed on the particle surfaces, and the thus treated particles are washed with water, dehydrated, wetted with an organic solvent miscible with water, dried in a vacuum, taken out into the air and then added into and mixed with the coating composition. These treatments allow non-oxidized stable presence of said particles in the magnetic recording layer.

If necessary, before coating the particle surfaces with a surfactant or an unsaturated fatty acid, the said particles may be subjected to surface coating with a metal oxide such as $TiO_2$, ZnO, etc., for obtaining higher chemical and magnetical stability.

In the present invention, the amount of the said carbon black particles and superparamagnetic fine particles to be contained in the coating layer is selected so that the total amount thereof is 0.1–10 wt%, preferably 1–10 wt% based on the magnetic particles. When the said amount is less than 0.1 wt%, it is difficult to obtain a magnetic recording medium with a light transmittance not more than 1%. When the said amount exceeds 10 wt%, the obtained magnetic recording medium is low in residual flux density (Br).

In the present invention, the superparamagnetic fine particles of iron oxide are used in an amount of 10–90 wt%, preferably 30–70 wt% based on the total amount of the said superparamagnetic fine particles and carbon black particles. When the said amount is less than 10 wt%, it is difficult to improve dispersibility of the magnetic particles in the vehicle, while when the said amount exceeds 90 wt%, the obtained magnetic recording medium may have a light transmittance higher than 1%.

The most important point of the above-mentioned invention is the fact that when the superparamagnetic fine particles of iron oxide are allowed to exist in a specified ratio in the magnetic recording layer, the orientation property and packing property of the magnetic particles in the coating layer are notably improved owing to the very excellent dispersibility of the magnetic particles in the vehicle, and also the amount of the carbon black particles to be contained in the coating layer can be lowered since the said superparamagnetic fine particles have the effect of reducing light transmittance.

The present inventors have considered that this fact is attributed to the synergistic effect of the carbon black particles and the superparamagnetic fine particles of iron oxide since it is impossible to attain the effect of the present invention either in case the carbon black particles alone arc allowed to exist in the magnetic recording layer or in case the superparamagnetic fine particles of iron oxide alone are let exist in the magnetic recording layer as seen from the Comparative Examples described later.

As for the reason why light transmittance can also be lowered when the content of carbon black particles is reduced by the addition of superparamagnetic fine particles of iron oxide, the present inventors have considered that it is attributable to the extremely high blackness degree realized by defining the $Fe^{2+}$ to $Fe^{3+}$ molar ratio to 0.16–0.5 in the composition of superparamagnetic fine particles.

The magnetic recording media according to the present invention have a residual flux density Br of not less than 800 Gauss, preferably not less than 1,000 Gauss, a squareness ratio (Br/Bm) of not less than 0.6, preferably not less than 0.7, an orientation of not less than 1.2, preferably not less than 1.7, a gloss at the angle of incidence of 45° of not less than 100%, preferably not less than 120%, and a light transmittance of not more than 1% preferably 0 to 0.7%.

The superparamagnetic fine particles of iron oxide according to the present invention have a large magnetization, excellent resistance to oxidation and a high blackness degree and are also low in magnetic attractive force owing to zero residual magnetization and excellent in miscibility with resin, so that they are suitable for use as particulate material for magnetic toner.

The superparamagnetic fine particles of the present invention are, of course, usable as pigment for paints or resin coloring since they are black in color, low in magnetic attractive force and excellent in dispersibility owing to adsorption of an unsaturated fatty acid on the particle surfaces.

Carbon black which has been used as a black pigment in the art involves the problems of safety and higiene, such as carcinogenecity, so use of the superparamagnetic fine particles according to the present invention since a substitute for carbon black is expected.

The magnetic recording media provided according to the present invention are notable for the improved orientation property and packing property of the particles in the coating layer owing to very excellent dispersibility of the magnetic particles in vehicle since the superparamagnetic fine particles of iron oxide are contained in a specified ratio in the magnetic recording layer, and it is also possible to decrease the content of carbon black particles since the said superparamagnetic fine particles have the effect of reducing light transmittance. In case of using superparamagnetic fine particles of iron oxide which are present on their surface an Al- and/or Si containing oxide or hydroxide, it is possible further to reduce the light transmittance.

Further, the magnetic recording media according to the present invention are even more improved in orientation property and packing property of the magnetic particles in the coat when using the fine magnetic particles having a BET specific surface area not less than 30 $m^2/g$, especially not less than 40 $m^2/g$, so that they can be advantageously used as magnetic recording media for high-density recording with low noise level.

It is to be also noted that since the superparamagnetic fine particles used in the present invention are high in apparent density (not less than 0.5 g/cm, preferably about 0.8 $g/cm^3$) and the amount of carbon black particles having a low apparent density can be reduced, workability in the preparation of magnetic coating material is good and the invention is also beneficial from the aspects of safety and hygiene.

EXAMPLES

The present invention will hereinafter be described more particularly with reference to the examples thereof and comparative examples.

In the descriptions of the following Examples and Comparative Examples, the average particle size (diameter) was determined from the full width at half maximum of the X-ray diffraction line (311) by using Scherer's method.

The magnetic properties were determined by applying an external magnetic field of up to 10 kOe by using a sample-vibrating type magnetometer Model (VSM-3S-15, mfg. by Toei Kogyo Co., Ltd.).

The change of rate of magnetization was shown by the reduction rate (%) of magnetization after leaving the particles at room temperature for one month.

The amount of $Fe^{2+}$ was determined by the chelate titration method.

The L* value (lightness) and a* value were represented by the respective value of specimens measured from the Hunter's Las space by using a multi-light source spectrocolorimeter (MSC-IS 2D, mfg. by Suga Shikenki Co., Ltd.) in accordance with the (L*, a*, b*) uniform sensory color space of CIE 1976. The closer the a* value (which indicates redness) to zero and the smaller the L* value, the better is blackness of the particles.

Specimens for measurement were obtained by mixing and kneading 0.5 g of superparamagnetic fine particles of iron oxide and 1.0 cc of castor oil by a Hoover muller to form a paste, adding 4.5 g of clear lacquer to the paste and kneading them to prepare a coating material and applying it onto cast coated paper by using a 6 mil applicator.

Evaluation of dispersibility of the magnetic particles in vehicle was made by determining a residual flux density (Br), a squareness ratio (Br/Bm), an orientation and a gloss of the tapes made by the said magnetic particles. The greater the value for each item, the better the dispersibility.

A surface gloss of coat surface in Tables 2, 4 and 6 was measured by using a glossmeter (UGv 5D, mfg. by Suga Shikenki Co, Ltd.) at an angle of incidence of 45° and 60° (Tables 2 and 4) and 45° (Table 6). It was shown by % when the standard plate gloss was given as 86.3% and 90.6%, respectively. The higher the gloss, the smoother the surface and the better the miscibility with resin.

A light transmittance was measured by using a photoelectric spectrophotometer (UV-2100, mfg. by Shimazu Seisakusho Co., Ltd.) at λ=900 nm. JIS×6121 regulates that light transmittance should be less than 1%.

Production of superparamagnetic particles of iron oxide

Synthesis Example 1

15.5 liters of a mixed solution composed of 7.75 liters of a 1.4 mol/l aqueous solution of $FeSO_4$ and 7.75 liters of a 2.8 mol/l aqueous solution of $FeCl_3$ was added dropwise with stirring, over a period of 5 minutes, to 34.5 liters of a 3.3 mol/l aqueous solution of NaOH heated to 80° C. The mixed solution was stirred while maintaining its temperature at 80° C. for 30 minutes, thereby obtaining a black precipitate. This product is called sample A.

Adsorption of unsaturated fatty acid on particle surfaces (Examples 1–9 and Comparative Examples 1–2

Example 1

To 500 ml of a slurry of sample A (corresponding to 25.1 g as the black particles) was added 67.8 g of a 10 wt% aqueous solution of sodium oleate (corresponding to 27 wt% of oleic acid based on the black particles), and the resultant mixture was stirred with a pH of 11.8 at a temperature of 80° C for 30 minutes to form a dispersion. Then 3N-H$_2$SO$_4$ was added to the obtained dispersion so as to lower its pH to 5.5. After cooled to room temperature, the dispersion was washed well with water by decantation and then dehydrated. The resulting product was wetted with 10 ml of methanol and then dryed in a vacuum at room temperature.

The obtained black particles were identified as spinel-type iron oxide by X-ray diffractometry and had an average particle size of 98 Å FIG. 1 is an electron micrograph ($\times$200,000) of the obtained black particles.

The particles had a magnetization of 54.2 emu/g; a residual magnetization of nearly 0 emu/g; a coercive force of nearly 0 Oe; a Fe$^{2+}$content (molar ratio of Fe$^{2+}$ to F2$^{3+}$) of 0.2.

The properties of coating layer of the obtained particles were as follows: L* value = 16.55; a* value =0.09; a gloss =72.1 when the angle of incidence is 45° and a gloss =80.2 when the angle of incidence is 60°.

EXAMPLES 2-9 and COMPARATIVE EXAMPLES 1-2

The black particles were obtained in the same procedure as Example 1 except for change of the amount of black precipitate, the kind and amount of unsaturated fatty acid or a salt thereof, pH and temperature in the course of stirring, the kind of acid and pH after its addition in the acid addition step, and the kind and amount of organic solvent.

The main particle-producing conditions in the above examples are shown in Table 1, and the properties of the produced black particles and their coating layers are shown in Table 2.

Production of superparamagnetic particles of iron oxide

Synthesis Example 2

15.5 liters of a mixed solution composed of 7.75 liters of a 1 4 mol/l aqueous solution of FeSO$_4$ and 7.75 liters of a 2.8 mol/l aqueous solution of FeCl$_3$ was added dropwise to 34.5 liters of a 3.3 mol/l aqueous solution of NaOH of 75° C. with stirring over a period of 5 minutes. The mixed solution was stirred while maintaining its temperature at 80° C. for 30 minutes, thereby forming a black precipitate.

A slurry containing the said black particles was washed well with water by means of decantation and then added with water to form a 5 wt% slurry solution. NaOH was added to 500 g of the said slurry solution so as to adjust its pH to 10, and then the solution was heated to 60° C. and stirred for 30 minutes at the same temperature. Then a 10 wt% aqueous solution of sodium aluminate was added in an amount of 2.5 g (corresponding to 0.33 wt% calculated as Al based on the black particle), and after 10-minute stirring at the same temperature, pH was adjusted to 8 and the solution was further stirred for 30 minutes to form a hydroxide of a aluminum present on the black particle surfaces. This product is called sample B.

Synthesis Example 3

The black particles having a hydroxide of aluminum present on their surfaces were produced in the same procedure as the Synthesis Example 2 except that the amount of the 10 wt% aqueous solution of sodium aluminate was changed to 12.5 g. The obtained product is called sample C.

Synthesis Example 4

The black particles having silicon oxide present on their surfaces were produced in the same procedure as the Synthesis Example 2 except that #3 water glass (produced by Tokuyama Soda Co., Ltd.; Si content corresponds to 29.0 wt% calculated as SiO$_2$) was added in an amount of 0.63 g (corresponding to 0.35 wt% calculated as Si based on the black particle) in place of the 10 wt% aqueous solution of sodium aluminate. The obtained product is called sample D.

Synthesis Example 5

The black particles having silicon oxide present on the surfaces were produced in the same procedure as the Synthesis Example 4 except that #3 water glass was used in an amount of 3.12 g. The product is called sample E.

Adsorption of unsaturated fatty acid on particle surfaces (Examples 10-13)

EXAMPLE 10

To 500 ml of a slurry of sample B (corresponding to 25.0 g as the black particles) was added 50.0 g of a 10 wt% aqueous solution of sodium oleate (corresponding to 20 wt% of oleic acid based on the black particles), and the resultant mixture was stirred with a pH of 8 at 60° C for 30 minutes to form a dispersion. Then 3N-HCl was added to the obtained dispersion so as to lower its pH to 6. After cooled to room temperature, the dispersion was washed well with water by decantation and then dehydrated. The resulting product was wetted with 10 ml of acetone and dryed in a vacuum at room temperature.

The obtained black particles were identified as spinel-type iron oxide by X-ray diffractometry and had an average particle size of 97 Å. Also, the amount of Al present on the black particle surface was determined to be 0.17 wt% by fluorescent X-ray analysis.

The obtained black particles had a magnetization of 55.7 emu/g; a residual magnetization of nearly 0; a coercive force of nearly 0 Oe; a Fe$^{2+}$content (calculated as Fe$^{2+}$ to Fe$^{3+}$ molar ratio) of 0.184.

The properties of the coating layer of the obtained particles were as follows: L* =16.95; a* =0.21; a gloss=1.0 when the angle of incidence is 45° and a gloss=70.1 when the angle of incidence is 60°.

EXAMPLES 11-13

The black particles were obtained in the same procedure as Example 10 except for change of the kind and amount of black precipitate, the kind and amount of unsaturated fatty acid or a salt thereof, pH and temperature in the course of stirring, the kind of acid used in the acid addition step, pH after acid addition, and the kind and amount of organic solvent.

Main particle producing conditions in the above examples are shown in Table 3, and the properties of the obtained black particles and their coating layers are shown in Table 4.

Figure 2:
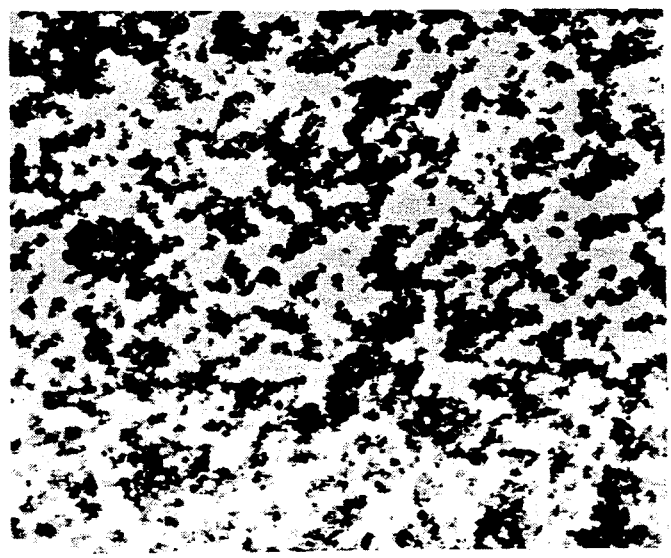
FIGS. 2 and 3 are electron micrographs ($\times 50,000$) showing the structure of a superparamagnetic fine particle of iron oxide obtained in Examples 11 and 13, respectively.
Figure 3:
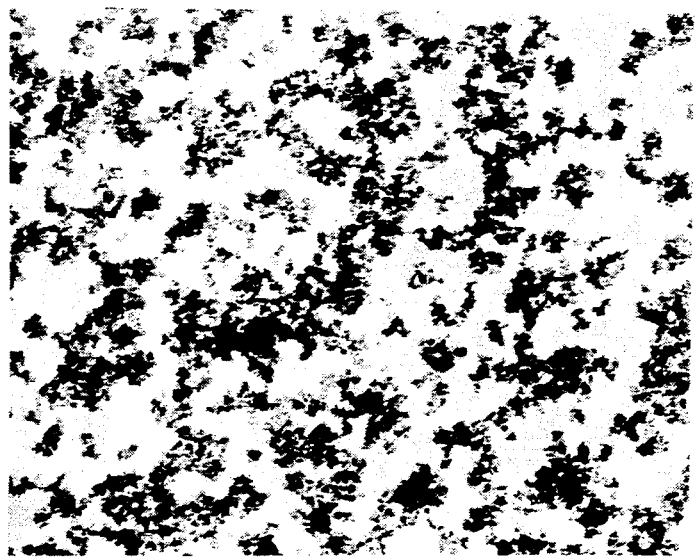

The black particles obtained in the above examples had an average particle size of 97 Å. FIGS. 2 and 3 are electron micrographs ($\times$50,000) of the black particles obtained in Examples 11 and 13, respectively.

EXAMPLE 14

100 parts by weight of Co-coated acicular $\gamma$-Fe$_2$O$_3$ particles (Co/total amount of the particles =4.2 wt%) having a major axis diameter of 0.20 $\mu$m, an axial ratio (major axis diameter/minor axis diameter) of 6.5, a BET specific surface area of 42 m$^2$/g, a coercive force of 840 Oe and a magnetization of 76.5 emu/g, 14 parts by weight of VAGH (a vinyl chloride-vinyl acetate-vinyl alcohol copolymer produced by U.C.C. Corp., U.S.A.), 1 part by weight of myristic acid, 30 parts by weight of toluene, 30 parts by weight of methyl ethyl ketone, 1 part by weight of Al$_2$O$_3$ powder, 4.5 parts by weight of carbon black powder (#3250, produced by Mitsubishi Kasei Co., Ltd.; particle size: 280 Å; BET specific surface area: 240 m$^2$/g) and 0.5 part by weight of superparamagnetic fine particles of iron oxide with a particle size of 97 Å (the ratio in total amount of said Al$_2$O$_3$ powder and carbon black powder to the magnetic particles being 5 wt%) were kneaded for 90 minutes by a kneader, and the kneaded material was diluted by adding 45 parts by weight of toluene and 45 parts by weight of methyl ethyl ketone and then mixed and dispersed for 3 hours by using a sand grinder.

To the mixed and dispersed material was added 140 parts by weight of a methyl ethyl ketone solution containing 14 parts by weight of polyurethane resin (Nipporan 2304, produced by Nippon Polyurethane Kogyo Co., Ltd.). After 30-minute mixing, the resultant mixture was filtered and the filtered material was mixed with 3 parts by weight of Colonete L (a trifunctional low-molecular weight isocyanate compound, produced by Nippon Polyurethane Kogyo Co., Ltd.) to prepare a magnetic paint.

This magnetic paint was applied on a polyester base film of 14 $\mu$m in thickness and the dried to form a magnetic coating layer of 4 $\mu$m in thickness. This coated film was cut to a width of ½ inch to make a magnetic tape.

The magnetic tape thus obtained had a coercive force of 876 Oe; a residual flux density Br of 1,190 Gauss; a squareness ratio (Br/Bm) of 0.770; an orientation of 1.91; a gloss of 120.4%; and a light transmittance of 0.59.

EXAMPLES 15-22 AND COMPARATIVE EXAMPLES 3-7

Magnetic tapes were made in the same procedure as Example 11 except for change of the kind of magnetic particles, amount of carbon black particles, kind and amount of superparamagnetic fine particles of iron oxide, and kind and amount of binder resin. The main producing conditions in the above examples are shown in Table 5, and the properties of the obtained magnetic tapes are shown in Table 6.

TABLE 1

| Examples and Comparative Examples | Slurry containing black precipitate Amount of slurry (ml) | Amount Solids content (black particles) (g) | Unsaturated fatty acid or a salt thereof Kind | Amount (g) | Unsaturated fatty acid/solid matter (wt %) | pH | Stirring Temperature (°C.) | Addition of acid Kind | pH-after addition | Wetting with organic solvent Kind | Amount (ml) |
|---|---|---|---|---|---|---|---|---|---|---|---|
| Example 1 | 500 | 25.1 | Sodium oleate | 6.78 | 27.0 | 11.80 | 80 | 3N—H$_2$SO$_4$ | 5.5 | Methanol | 10 |
| Example 2 | 500 | 25.1 | " | 4.52 | 18.0 | 11.80 | 80 | " | 5.5 | " | 10 |
| Example 3 | 500 | 25.1 | " | 2.76 | 11.0 | 11.80 | 80 | " | 5.5 | " | 10 |
| Example 4 | 500 | 25.1 | " | 7.48 | 29.8 | 11.75 | 80 | 3N—HCl | 6.0 | Acetone | 10 |
| Example 5 | 500 | 25.1 | " | 4.99 | 19.9 | 11.75 | 80 | " | 6.0 | " | 10 |
| Example 6 | 500 | 25.1 | " | 3.02 | 12.0 | 11.75 | 80 | " | 6.0 | " | 10 |
| Example 7 | 100 | 5.0 | Linolic acid | 1.50 | 30.0 | 12.25 | 80 | 3N—H$_2$SO$_4$ | 6.0 | Methanol | 3 |
| Example 8 | 100 | 5.0 | " | 1.00 | 20.0 | 12.25 | 80 | " | 6.0 | " | 3 |
| Example 9 | 100 | 5.0 | Linolic acid | 1.50 | 30.0 | 12.25 | 80 | " | 6.0 | " | 3 |
| Comp. Example 1 | 500 | 25.1 | — | — | — | — | — | 3N—H$_2$SO$_4$ | 5.5 | Methanol | 10 |
| Comp. Example 2 | 500 | 25.1 | Sodium oleate | 6.78 | 27.0 | 11.80 | 80 | " | 5.5 | — | — |

TABLE 2

| | Superparamagnetic fine particles of iron oxide | | | | | | | | | | | |
|---|---|---|---|---|---|---|---|---|---|---|---|---|
| | Unsaturated fatty acid | | | Magnetization | | | Superparamagnetic fine particles of iron oxide | | Properties of coating layer | | | |
| Examples and Comparative Examples | Amount of adsorbed (wt %) | Coverage | Residual magnetization (emu/g) | After treatment with unsaturated fatty acid (emu/g) | After 1 month (emu/g) | Rate of change (%) | Coercive force (Oe) | $Fe^{2+}/Fe^{3+}$ (molar ratio) | Color measurement L* | a* | Gloss 45° | 60° |
| Example 1 | 20.2 | 1.11 | ≅0 | 54.2 | 53.8 | 0.74 | ≅0 | 0.200 | 16.55 | 0.09 | 72.1 | 80.2 |
| Example 2 | 13.8 | 0.76 | ≅0 | 55.0 | 54.4 | 1.09 | ≅0 | 0.195 | 16.72 | 0.14 | 65.4 | 74.1 |
| Example 3 | 10.8 | 0.59 | ≅0 | 56.6 | 55.8 | 1.41 | ≅0 | 0.191 | 16.78 | 0.25 | 61.2 | 70.2 |
| Example 4 | 21.2 | 1.16 | ≅0 | 53.8 | 53.5 | 0.56 | ≅0 | 0.197 | 16.89 | 0.15 | 72.3 | 81.0 |
| Example 5 | 14.2 | 0.78 | ≅0 | 54.7 | 54.2 | 0.91 | ≅0 | 0.192 | 17.23 | 0.24 | 64.7 | 73.8 |
| Example 6 | 11.7 | 0.64 | ≅0 | 56.2 | 55.6 | 1.07 | ≅0 | 0.187 | 17.02 | 0.29 | 60.2 | 69.8 |
| Example 7 | 18.2 | 1.00 | ≅0 | 53.5 | 53.2 | 0.56 | ≅0 | 0.182 | 17.12 | 0.23 | 70.5 | 78.8 |
| Example 8 | 13.1 | 0.72 | ≅0 | 54.1 | 53.7 | 0.74 | ≅0 | 0.175 | 16.88 | 0.31 | 65.9 | 75.2 |
| Example 9 | 17.2 | 0.94 | ≅0 | 53.8 | 53.5 | 0.56 | ≅0 | 0.177 | 17.24 | 0.25 | 69.2 | 78.1 |
| Comp. Example 1 | 0 | 0 | ≅0 | 58.9 | 48.5 | 17.66 | ≅0 | 0.131 | 18.66 | 1.56 | 49.5 | 59.4 |
| Comp. Example 2 | 10.5 | 0.58 | ≅0 | 49.2 | 48.6 | 1.22 | ≅0 | 0.135 | 18.65 | 1.40 | 59.5 | 68.5 |

TABLE 3

| | Slurry containing black precipitate | | | Unsaturated fatty acid or a salt thereof | | | | | Addition of acid | | Wetting with organic Solvent | |
|---|---|---|---|---|---|---|---|---|---|---|---|---|
| Example No. | Kind of slurry | Amount of slurry (g) | Solids content (black particles) (g) | Kind | Amount (g) | Unsaturated fatty acid/solid matter (wt %) | Stirring pH | Temp. (°C.) | Kind | pH after addition | Kind | Amount (ml) |
| 10 | B | 500 | 25 | Sodium oleate | 5 | 20 | 8.0 | 60 | 3N—HCl | 6.0 | Acetone | 10 |
| 11 | C | 500 | 25 | Sodium oleate | 5 | 20 | 8.0 | 60 | " | 6.0 | " | 10 |
| 12 | D | 500 | 25 | Sodium oleate | 5 | 20 | 8.0 | 60 | " | 6.0 | " | 10 |
| 13 | E | 500 | 25 | Sodium oleate | 5 | 20 | 8.0 | 60 | " | 6.0 | " | 10 |

TABLE 4

| | Superparamagnetic fine particles of iron oxide | | | | | | | | | | | | |
|---|---|---|---|---|---|---|---|---|---|---|---|---|---|
| | Al or Si or oxide or hydroxide containing Al or Si | | Unsaturated fatty acid Amount of adsorbed (wt %) | Residual magnetization (emu/g) | Magnetization After treatment with unsaturated fatty acid (emu/g) | After 1 month (emu/g) | Rate of change (%) | Coercive force (Oe) | $Fe^{2+}/Fe^{3+}$ (molar ratio) | Properties of coating layer | | | |
| Example No. | Amount of Si (wt %) | Amount of Al (wt %) | | | | | | | | Color measurement L* | a* | Gloss 45° | 60° |
| 10 | — | 0.17 | 12.5 | ≅0 | 55.7 | 55.3 | 0.72 | ≅0 | 0.184 | 16.95 | 0.21 | 61.0 | 70.1 |
| 11 | — | 0.81 | 14.0 | ≅0 | 54.0 | 53.8 | 0.37 | ≅0 | 0.201 | 16.82 | 0.11 | 64.2 | 72.3 |
| 12 | 0.21 | — | 8.6 | ≅0 | 56.9 | 56.6 | 0.52 | ≅0 | 0.178 | 17.02 | 0.24 | 59.0 | 68.4 |
| 13 | 1.10 | — | 7.4 | ≅0 | 54.8 | 54.3 | 0.91 | ≅0 | 0.169 | 17.11 | 0.25 | 57.2 | 68.0 |

TABLE 5

| Examples and Comp. Examples | Magnetic particles Kind | Major axis (μm) | Axial ratio (major axial diameter/ minor axial diameter) | BET specific surface area (m²/g) | Coercive force (Oe) | Magnetization (emu/g) | Amount of black carbon particles (g) |
|---|---|---|---|---|---|---|---|
| Example 14 | Co-coated γ-Fe₂O₃ (Co/total amount = 4.2 wt %) | 0.20 | 6.5 | 42 | 840 | 76.5 | 4.5 |

TABLE 5-continued

| | | | | | | | |
|---|---|---|---|---|---|---|---|
| Example 15 | Co-coated γ-Fe$_2$O$_3$ (Co/total amount = 4.2 wt %) | 0.20 | 6.5 | 42 | 840 | 76.5 | 4.0 |
| Example 16 | Co-coated γ-Fe$_2$O$_3$ (Co/total amount = 4.2 wt %) | 0.20 | 6.5 | 42 | 840 | 76.5 | 3.0 |
| Example 17 | Co-coated γ-Fe$_2$O$_3$ (Co/total amount = 4.2 wt %) | 0.20 | 6.5 | 42 | 840 | 76.5 | 2.0 |
| Example 18 | Co-coated γ-Fe$_2$O$_3$ (Co/total amount = 4.2 wt %) | 0.20 | 6.5 | 42 | 840 | 76.5 | 2.0 |
| Example 19 | Metallic magnetic particles mainly composed of Fe | 0.15 | 8.3 | 50.0 | 1570 | 132.0 | 3.0 |
| Example 20 | Lamellar composite ferrite particles containing Ba | Plate surface d.0.18 | Plate ratio 7/1 | 35.0 | 736 | 57.2 | 3.0 |
| Example 21 | Co-coated γ-Fe$_2$O$_3$ (Co/total amount = 4.2 wt %) | 0.20 | 6.5 | 42 | 840 | 76.5 | 4.0 |
| Example 22 | Co-coated γ-Fe$_2$O$_3$ (Co/total amount = 4.2 wt %) | 0.20 | 6.5 | 42 | 840 | 76.5 | 4.0 |
| Comp. Example 3 | Magnetic particles same as Example 14 | | | | | | 0 |
| Comp. Example 4 | " | | | | | | 6 |
| Comp. Example 5 | " | | | | | | 0 |
| Comp. Example 6 | Magnetic particles same as Example 19 | | | | | | 3 |
| Comp. Example 7 | Magnetic particles same as Example 20 | | | | | | 3 |

| Examples and Comp. Examples | Superparamagnetic fine particles of iron oxide Kind (Å) | Amount (g) | Superparamagnetic fine particles/ both types of particles (wt %) | Total amount of both types of particles/ magnetic particles (wt %) | Binder resin Kind | Amount (g) |
|---|---|---|---|---|---|---|
| Example 14 | Example 3 | 0.5 | 10 | 5 | VAGH Polyurethane resin | 14 14 |
| Example 15 | Example 3 | 1.0 | 20 | 6 | VAGH Polyurethane resin | 14 14 |
| Example 16 | * | 3.0 | 50 | 6 | VAGH Polyurethane resin | 14 14 |
| Example 17 | * | 4.0 | 66 | 6 | VAGH Polyurethane resin | 14 14 |
| Example 18 | Example 3 | 5.0 | 71 | 7 | VAGH Polyurethane resin | 14 14 |
| Example 19 | Example 3 | 1.0 | 25 | 4 | VAGH Polyurethane resin | 14 14 |
| Example 20 | Example 3 | 1.0 | 25 | 4 | VAGH Polyurethane resin | 14 14 |
| Example 21 | Example 10 | 1.0 | 20 | 6 | VAGH Polyurethane resin | 14 14 |
| Example 22 | Example 12 | 1.0 | 20 | 6 | VAGH Polyurethane resin | 14 14 |
| Comp. Example 3 | — | 0 | 0 | — | VAGH Polyurethane resin | 14 14 |
| Comp. Example 4 | — | 0 | 0 | 6 | VAGH Polyurethane resin | 14 14 |

TABLE 5-continued

| | | | | | | |
|---|---|---|---|---|---|---|
| Comp. Example 5 | Example 3 | 6 | 100 | 6 | VAGH | 14 |
| | | | | | Polyurethane resin | 14 |
| Comp. Example 6 | — | 0 | 0 | 3 | VAGH | 14 |
| | | | | | Polyurethane resin | 14 |
| Comp. Example 7 | — | 0 | 0 | 3 | VAGH | 14 |
| | | | | | Polyurethane resin | 14 |

Note:
*Superparamagnetic fine particles of iron oxide (92Å, adsorbed amount of unsaturated fatty acid: 10.8 wt %)

What is claimed is:

1. Superparamagnetic iron oxide particles having a molecular layer of an unsaturated fatty acid adsorbed on the iron oxide particle surface thereof and having a magnetization of not less than 50 emu/g and an $Fe^{2+}$ content calculated as $Fe^{2+}/Fe^{3+}$ molar ratio of 0.16 to 0.5, the change of magnetization of the particles after one month at room temperature being no more than 10%, wherein the converage $\theta$ of said molecular layer of the unsaturated fatty acid adsorbed on the iron oxide particle surface is 0.5 to 1.2 and is determined according to the formula:

$$\theta = \frac{W}{M} \times 6.023 \times 10^{23} \times \frac{A}{S \times 10^{20}},$$

wherein W is the weight in grams of the unsaturated fatty acid adsorbed per 1 g of superparamagnetic fine particles;

M is the molecular weight of the unsaturated fatty acid;

A is the area in square angstroms occupied by the adsorbed unsaturated fatty acid and S is the BET specific surface area in square meters per gram of superparamagnetic fine particles after nitrogen adsorption.

2. Superparamagnetic iron oxide particles according to claim 1 wherein aluminum or silicon oxide or hydroxide or both is present between the iron oxide particle surface and the molecular layer of the unsaturated fatty acid adsorbed on the particle surface, the change of the magnetization of the particles after one month at room temperature being no more than 5%.

3. Superparagnetic iron oxide particles according to claim 1, wherein the unsaturated fatty acid layer is 1 to 30% by weight of the overall weight of the particles.

4. Superparamagnetic iron oxide particles according to claim 2, wherein the weight of the aluminum or silicon oxide or hydroxide is 0.01 to 50% by weight of the weight of the particles.

* * * * *